April 21, 1959  L. P. DE ZELAR  2,882,807
FILM STOPPING AND EXPOSURE COUNTING MEANS
Filed April 26, 1956
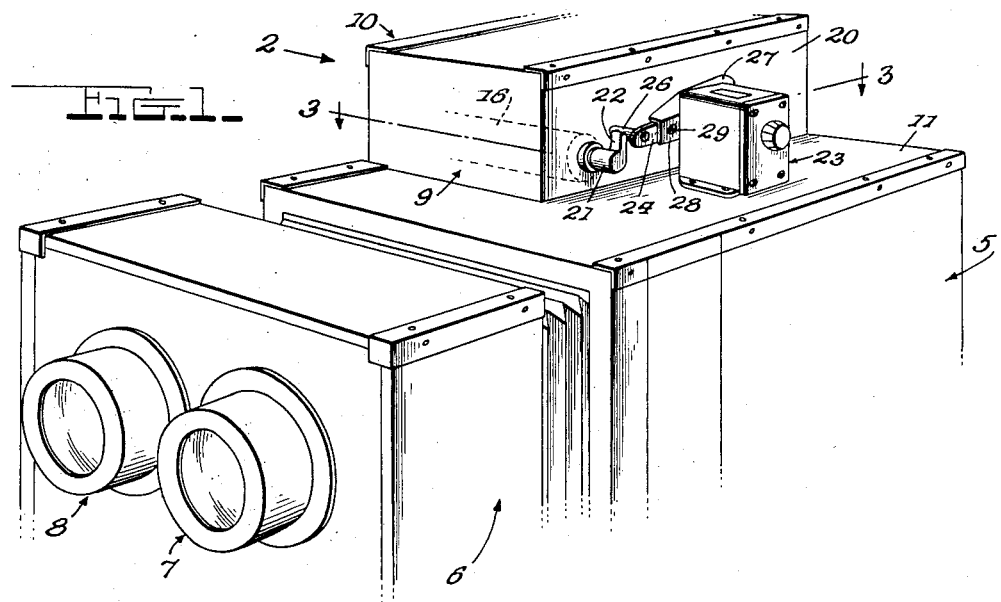
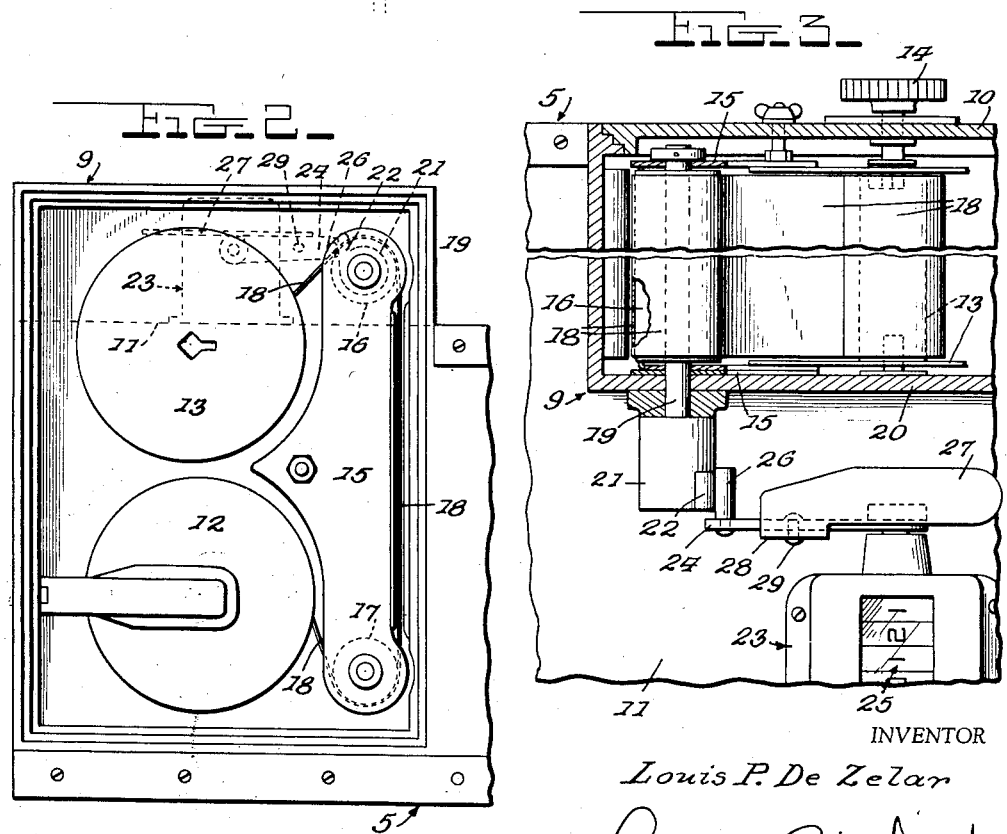
INVENTOR
Louis P. De Zelar
BY
ATTORNEYS

United States Patent Office 2,882,807
Patented Apr. 21, 1959

2,882,807

FILM STOPPING AND EXPOSURE COUNTING MEANS

Louis P. De Zelar, Peoria, Ill.

Application April 26, 1956, Serial No. 580,769

2 Claims. (Cl. 95—31)

This invention relates to improvements in photographic cameras and more specifically to novel means for limiting each advance of the usual film and for registering the successive exposures on a counter.

One object of the invention is to provide a novel association of elements in which a single hand-actuated member is provided having the dual function of releasing the film stop and simultaneously operating the exposure counter.

Another object of the invention is to provide a novel association of elements in which the counter has a pivoted hand-actuated arm movable from one position to another to cause counter operation, said arm when in said one position, constituting a film stop.

Yet another object is to provide the pivoted arm with a novel thumb plate for moving said arm to the position at which it releases the film and operates the counter.

A further object is to provide a novel film stopping and exposure counting means well adapted for 70 mm. twin-lens, reflex camera.

With the above and other objects in view that will become apparent as the nature of the invention is better understood, the same consists in the novel form, combination and arrangement of parts hereinafter more fully described, shown in the accompanying drawing, and claimed.

In the drawing:

Fig. 1 is a perspective view showing a portion of a 70 mm. twin-lens, reflex camera embodying the invention;

Fig. 2 is a fragmentary side elevation as indicated by the arrow 2 of Fig. 1, the film magazine door being removed; and Fig. 3 is a horizontal sectional view partly in elevation, substantially on line 3—3 of Fig. 1.

The camera shown, includes a casing 5, a support 6 for a focusing lens 7 and a photographic lens 8, and a film magazine 9 having a removable loading door 10, said magazine projecting above the casing top 11, as usual.

Within the magazine 9, suitable means are provided for mounting a supply spool 12 and a receiving spool 13, and the latter is rotatable as usual by means of a knob 14 mounted on the door 10. Brackets 15 in the magazine mount an upper roller 16 and a lower roller 17 for guiding the film 18 from the spool 12 to the spool 13, as usual.

The upper roller 16 is constructed from soft rubber or the like to insure that the film 18 shall drive this roller without slippage whenever the film is being advanced. The shaft 19 of this roller 16 is also extended outwardly through the inner wall 20 of the film magazine 9 above the adjacent portion of the casing top 11. The projecting shaft end is provided with a head 21 having a lateral stop 22.

A counter 23 is mounted on the casing top 11 near the magazine wall 20. This counter has an operating arm 24 swingable by hand from a normally lowered position to a raised position to operate conventional counting or registering means 25 as shown in Fig. 3. The counter 23 is so positioned that its arm 24 constitutes a relatively stationary stop cooperable with the rotatable stop 22, when said arm 24 occupies its lowered position, to limit advance of the film 18 for any exposure. In the present showing, the free end of the arm 24 has a lateral pin 26 to be struck by the stop 22 when the roller 16 has made a complete revolution, accompanied of course, by proper film advance for the next exposure. After the exposure is made, movement of the arm 24 to its raised position permits film advance for the next exposure and also operates the counter 23. Return of the arm 24 positions it to limit the next advance of the film.

To facilitate operation of the arm 24, a thumb plate 27 is provided, said thumb plate having a downwardly projecting lug 28 riveted at 29 or otherwise secured to said arm. The thumb plate 27 extends beyond the pivot of the arm 24, and depression of the free end of said thumb plate will therefore upwardly swing said arm.

From the foregoing, it will be seen that novel and advantageous provision has been disclosed for attaining the desired ends, and while there is herein shown and described the preferred embodiment of the invention, it is nevertheless to be understood that minor changes may be made therein without departing from the spirit and scope of the invention as claimed.

I claim:

1. In a camera, a casing, a film magazine projecting upwardly beyond the top of said casing, and upper and lower rollers in said magazine for guiding a film from a supply spool to a receiving spool, said upper roller having a shaft rotatable therewith and extending to the exterior of said magazine over a portion of said casing top, a stop projecting laterally from the outer end of said shaft and disposed exteriorly of said magazine, and an exposure counter mounted on said portion of said casing top, said counter having a pivoted operating arm movable from a normally lowered position to a raised position, said arm being operable completely independently of the shaft of said upper roller and said arm when in said lowered position being cooperable with said stop to limit film advance, movement of said arm to said raised position serving to completely disengage said stop from said arm so as to release said stop and operate said counter.

2. A structure as set forth in claim 1; together with a thumb plate attached to said arm and extending longitudinally thereof to a point beyond the arm pivot, said thumb plate being usable to release said arm and thereby operate said counter.

References Cited in the file of this patent

UNITED STATES PATENTS

| 432,990 | Eastman et al. | July 29, 1890 |
| 433,020 | McKellen | July 29, 1890 |
| 800,096 | Fothergill | Sept. 19, 1905 |
| 1,385,409 | Veeder | July 26, 1921 |
| 1,931,890 | Burns | Oct. 24, 1933 |
| 2,345,999 | Babcock | Apr. 4, 1944 |

FOREIGN PATENTS

| 624,351 | Germany | Jan. 18, 1936 |
| 445,943 | Italy | Mar. 4, 1949 |
| 306,663 | Switzerland | Apr. 30, 1955 |